(12) United States Patent
Chin et al.

(10) Patent No.: US 9,473,033 B2
(45) Date of Patent: Oct. 18, 2016

(54) PROGRAMMING OF A TWO TERMINAL DEVICE

(71) Applicant: Dialog Semiconductor Inc., Campbell, CA (US)

(72) Inventors: Kai-Wen Chin, Campbell, CA (US); John Kesterson, Campbell, CA (US); Fuqiang Shi, Campbell, CA (US); Henry Wong, Campbell, CA (US); Pengju Kong, Campbell, CA (US)

(73) Assignee: DIALOG SEMICONDUCTOR, INC., Campbell, CA (US)

( * ) Notice: Subject to any disclaimer, the term of this patent is extended or adjusted under 35 U.S.C. 154(b) by 13 days.

(21) Appl. No.: 14/584,819

(22) Filed: Dec. 29, 2014

(65) Prior Publication Data
US 2016/0164419 A1    Jun. 9, 2016

Related U.S. Application Data

(60) Provisional application No. 62/089,142, filed on Dec. 8, 2014.

(51) Int. Cl.
*H02M 3/335*    (2006.01)

(52) U.S. Cl.
CPC .................. *H02M 3/33507* (2013.01)

(58) Field of Classification Search
CPC ........... H02M 3/33507; H02M 3/335; H02M 3/33523; H02M 3/33592; H02M 7/53871; Y02B 70/1433; Y02B 70/126
USPC ........ 363/21.01–21.11, 21.12–21.18, 84, 88, 363/89–90, 97–98
See application file for complete search history.

(56) References Cited

U.S. PATENT DOCUMENTS

| | | | |
|---|---|---|---|
| 2012/0300520 A1* | 11/2012 | Ren | H02M 1/32 363/127 |
| 2014/0376272 A1* | 12/2014 | Miao | H02M 3/33592 363/21.02 |
| 2015/0207420 A1* | 7/2015 | Wang | H02M 3/33507 363/21.12 |

* cited by examiner

*Primary Examiner* — Nguyen Tran
(74) *Attorney, Agent, or Firm* — Haynes and Boone, LLP

(57) ABSTRACT

A two-terminal device that is configured to respond to a voltage modulation of an input signal received through the two terminals by triggering an action. The two-terminal device is further configured to verify a result of the triggered action by modulating a current driven through the two termi+6nals.

17 Claims, 3 Drawing Sheets

PROGRAMMING OF A TWO TERMINAL DEVICE

RELATED APPLICATIONS

This application claims the benefit of U.S. Provisional Application No. 62/089,142, filed Dec. 8, 2014, the contents of which are incorporated herein in their entirety.

TECHNICAL FIELD

This application relates to configuration of devices, and more particularly to the configuration of a device having two terminals and to the verification of the configuration.

BACKGROUND

The explosive growth in mobile electronic devices such as smartphones and tablets creates an increasing need in the art for compact and efficient switching power converters so that users may recharge these devices. A flyback switching power converter is typically provided with a mobile device as its transformer provides safe isolation from AC household current. This isolation introduces a problem in that the power switching occurs at the primary side of the transformer but the load is on the secondary side. The power switching modulation for a flyback converter requires knowledge of the output voltage on the secondary side of the transformer. Such feedback can be obtained through opto-isolators bridging from the secondary side to the primary side but this adds to cost and control complexity. Thus, primary-only feedback techniques have been developed that use the reflected voltage on the primary side of the transformer in each switching cycle.

In a switching cycle for a flyback converter, the secondary current (the current in the secondary winding of the transformer) pulses high after the primary-side power switch is cycled off The secondary current then ramps down to zero as power is delivered to the load. The delay between the power switch off time and the secondary current ramping to zero is denoted as the transformer reset time (Trst). The reflected voltage on the primary winding at the transformer reset time is proportional to the output voltage because there is no diode drop voltage on the secondary side as the secondary current has ceased flowing. The reflected voltage at the transformer reset time is thus directly proportional to the output voltage based upon the turn ratio in the transformer and other factors. Primary-only feedback techniques use this reflected voltage to efficiently modulate the power switching and thus modulate the output voltage.

One issue, however, with primary-only feedback occurs during low-load or no-load periods of operation. The primary-only feedback controller in the flyback converter detects this lack of activity on the secondary side of the transformer and stops cycling the power switch accordingly so that the secondary side is not driven out of regulation. Such lack of pulsing is satisfactory so long as the load remains dormant. But should the load again be applied, the controller has no way of detecting this reapplication of the load without a current pulse being generated to produce reflected voltage on the primary side (for example, as sensed through a primary-side auxiliary winding).

To solve this problem, an activity detector has been developed for coupling to the output diode on the load side of the converter. The activity detector is configured to generate a secondary winding current pulse despite the power switch continuing to be dormant. An example of such an activity detector is provided by commonly-assigned U.S. application Ser. No. 14/340,482, (the '482 application) filed Jul. 24, 2014, the contents of which are hereby incorporated by reference in their entirety. This secondary-side activity detector detects the termination of a secondary current pulse as generated conventionally from a cycle of the primary-side power switch. After this transformer reset time, the voltage across the auxiliary winding will oscillate due to the resonant circuit formed by the inductance of the transformer and the parasitic capacitance of the power switch. Since this oscillation could be interpreted by the controller as the application of a load (or occurrence of a fault condition), the secondary-side activity detector delays after the Trst time for a "blanking period" to allow the oscillations to sufficiently subside. Upon the termination of the blanking period, the secondary-side activity detector monitors the voltage difference across the rectifying diode on the secondary side to determine whether a load has been applied. With an applied load, the voltage across the rectifying diode changes as the load capacitor discharges. The secondary-side activity detector detects this voltage difference across the rectifying diode and switches on a low-impedance current path that bypasses the rectifying diode. For example, the secondary-side activity detector may comprise a two-terminal device that couples to the cathode and anode of the rectifying diode. Should the secondary-side activity detector detect a load-induced voltage change across the rectifying diode subsequent to the blanking period, it shorts the cathode and anode of the rectifying diode through its low-impedance alternative current path. This low-impedance current path allows the charged output capacitor on the secondary side of the converter to send a pulse of current through the secondary winding that in turn creates a reflected pulse on the primary-side auxiliary winding. The flyback controller is configured to detect this secondary current pulse. Since this secondary current pulse is not created by the pulsing of the power switch, the corresponding reflected voltage is denoted herein as an "activity signal" to distinguish it from the reflected voltage obtained from a power switch cycle.

In response to detecting the activity signal, the flyback controller cycles the power switch. The resulting reflected voltage may then be used through primary-only feedback techniques to directly monitor the output voltage so that it may be regulated accordingly. Although this generation of an activity signal is quite advantageous, note that the activity detector may need to be configured with operating parameters. It is conventional to program devices with such operating parameters using a write-once memory such as a bank of fuses. A bit of configuration data is written to the device by either "blowing" the corresponding fuse or leaving it intact. To ensure that the configuration of the fuses was done correctly, the configuration data is then retrieved following configuration of the device. Such writing and reading of configuration data conventionally requires at least three terminals: a configuration write terminal, a configuration read terminal, and a ground terminal. But note that the activity detector disclosed in the '482 application has just two terminals. Although this is quite advantageous with regard to reducing manufacture costs, the resulting lack of terminals prevents a conventional configuration of the device.

Accordingly, there is a need in the art for techniques enabling the programming and verification of a memory within a device having just two terminals.

SUMMARY

A two-terminal device is provided that responds to a voltage-modulated input signal received through its two terminals by triggering an action such as within the device. The two-terminal device is configured to confirm the results of the action by modulating a current flowing between the two terminals. These advantageous features may be better appreciated through the following detailed description.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

To address the need in the art for programming techniques for two-terminal devices, a two-terminal device is provided that may be configured in response to a voltage-modulated input signal applied through its two terminals. The two-terminal device includes a controller for responding to the voltage modulation so as to configure itself accordingly. The controller also controls a modulation of an output current flowing between the two terminals to verify the device's configuration. The following discussion will be addressed to the configuration of a memory array within the two-terminal device such as a fuse array. But it will be appreciated that the concepts disclosed herein may be applied to the triggering and confirmation of other actions besides the configuration of a memory. For example, a two-terminal device may include a built-in-self-test (BIST) circuit that would be triggered in response to the voltage-modulated signal. The results of the BIST operation could then be read out through the current-modulated signal.

Figure 1:
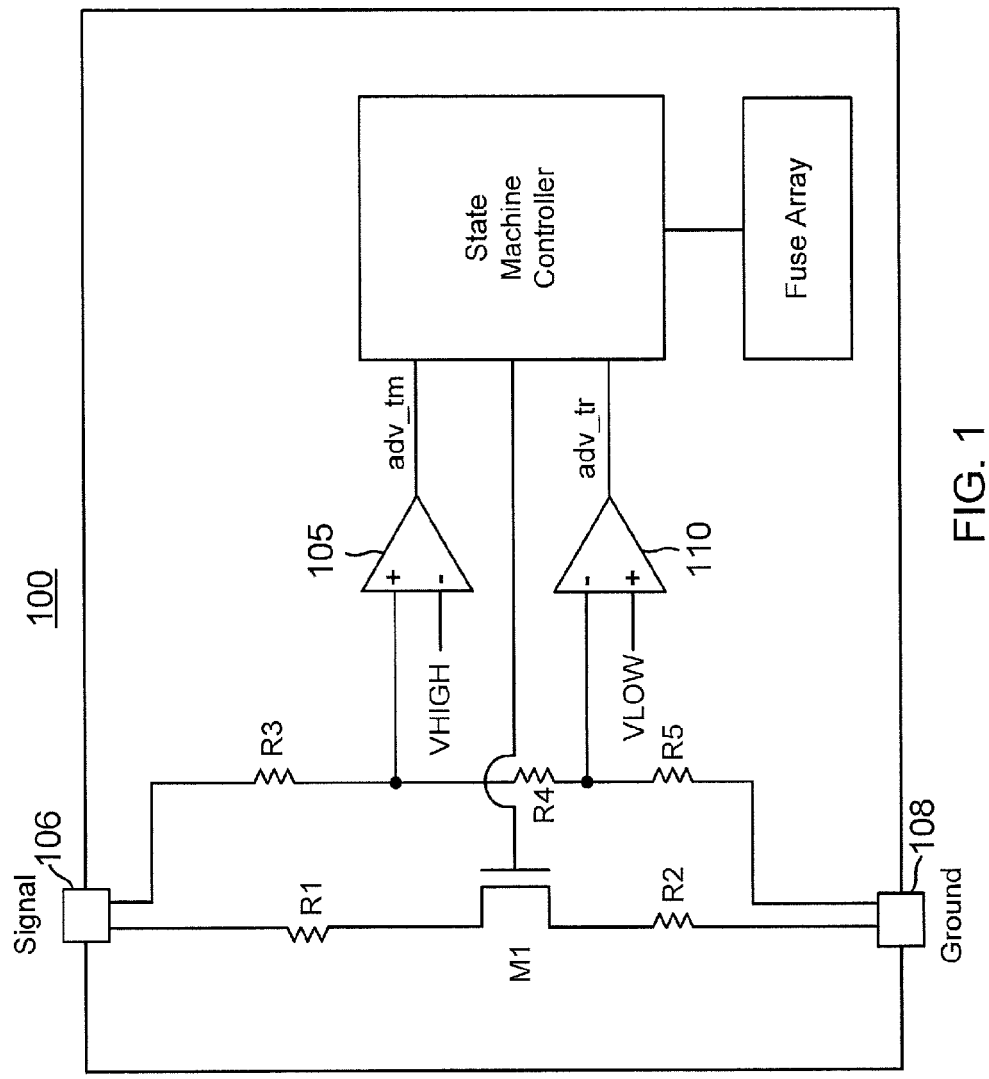
FIG. 1 is a circuit diagram of a two-terminal device in accordance with an embodiment of the disclosure.

An example, two-terminal device 100 is shown in FIG. 1. Device 100 includes just two terminals: a signal terminal 106 and a ground terminal 108. Device 100 receives a voltage-modulated input signal at signal terminal 106 that drives a voltage divider network such as formed by resistors R3, R4, and R5. With regard to the voltage modulation of the input signal used to configure device 100, an external programmer (not illustrated) may maintain the voltage-modulated input signal between a high voltage threshold level and a low voltage threshold level while the external programmer is in a default or inactive mode. Such a default mode occurs when the external programmer (which may also be designated as a programming device) is not actively configuring a memory within device 100. The following discussion will assume that the memory being configured within device 100 is a fuse array but it will be appreciated that other types of memory such as a flash array may be configured using the techniques and systems disclosed herein. In one embodiment, the high voltage threshold may equal 8.0 V whereas the low voltage threshold may equal 4.85 V although it will be appreciated that other voltage threshold levels may be used in alternative embodiments. Prior to triggering a configuration of device 100, the external programmer may maintain the voltage-modulated input signal at an intermediate voltage between the two threshold levels such as at 6.0 V. The external programmer may then control a state of a state machine controller within device 100 by pulsing the voltage-modulated input signal above the high voltage threshold and also pulsing it below the low voltage threshold.

To detect the state of the voltage-modulated input signal, device 100 may include a high voltage comparator 105 and a low voltage comparator 110. High voltage comparator 105 compares a voltage of a first node between resistors R3 and R4 to a first voltage threshold (VHIGH). This first node voltage equals the ratio of the resistances (R4+R5)/(R3+R4+R5) times the input signal voltage. The VHIGH threshold voltage may be scaled according to this ratio so that high voltage comparator 105 functions to detect when the input signal voltage exceeds a high voltage threshold such as the 8.0 V threshold discussed above. Since the first node voltage is received at a positive input for high voltage comparator 105, comparator 105 will assert an output signal (adv_tm) whenever the voltage-modulated input signal exceeds the high voltage threshold. The external programmer may pulse the voltage-modulated input signal above the high voltage threshold for a certain pulse width (e.g., 30 μs). The output signal adv_tm of high voltage comparator 105 will then be pulsed or asserted according to the same pulse width. The state machine controller responds to the assertion of the high voltage comparator output signal adv_tm. For example, the state machine controller may respond to the rising edge of each pulsing of the adv_tm output signal.

Low voltage comparator 110 compares a voltage of a second node between resistors R4 and R5 to a voltage threshold (VLOW). This second node voltage equals the ratio of the resistances (R5)/(R3+R4+R5) times the input signal voltage. The VLOW threshold voltage may be scaled accordingly so that low voltage comparator 110 functions to detect when the input signal voltage falls below a low voltage threshold such as the 4.85 V threshold discussed above. Since the second node voltage is received at a negative input for low voltage comparator 110, comparator 110 will assert an output signal (adv_tr) whenever the input signal voltage falls below the low voltage threshold. The external programmer driving the voltage-modulated input signal may pulse it low according a pulse width such as that used for the high voltage pulses. The output signal adv_tr from low voltage comparator 110 will then be asserted or pulsed high according to the same pulse width. The state machine controller responds to the assertion of the low voltage comparator output signal adv_tr such as by responding to the rising edge of this signal.

The state machine controller may be configured to respond to an assertion of the output signal adv_tm from high voltage comparator 105 as a mode select signal for its various states of operation. For example, the fuse array being written to may accommodate the storage of a plurality of digital words. To configure these digital words, the external programmer may toggle or pulse the voltage-modulated input signal above the high voltage threshold separately to begin the configuration of each digital word storage location within the memory. Thus an initial pulsing of the voltage-modulated input signal above the high voltage threshold may signal the configuration of a first digital word in the fuse array. The state machine controller would thus enter a state corresponding to the programming of the first digital word in the fuse array responsive to this initial high voltage pulse.

Operation of the state machine controller within each state as selected by the pulsing of the adv_tm output signal may be controlled by the pulsing of the adv_tr output signal. In this fashion, the external programmer would select for a desired state of operation (e.g., configuration or verification of a particular digital word) by pulsing the output signal adv_tm. Within the selected state, the external programmer controls the operation of device 100 by pulsing the output signal adv_tr. These internal output signals adv_tm and adv_tr in turn are controlled by the voltage pulsing high or low of the voltage-modulated input signal.

Each digital word being written into the fuse array comprises a certain number of bits depending upon the word length for the fuse array. For example, if the word width is eight bits, each digital word stored in the fuse array may have a digital value that ranges from zero to two hundred and fifty five. The external programmer may then transmit the appropriate digital value for each word by pulsing the voltage-modulated input signal below the low voltage threshold according to this digital value. For example, if a digital word is to have a value of one hundred, the external programmer may pulse the voltage-modulated signal low one hundred times accordingly.

The state machine controller may then count the resulting number of the adv_tr pulses to determine the digital content for the corresponding word in the fuse array. A subsequent high voltage pulse of the voltage-modulated signal may be used to indicate that the count for the corresponding digital word is completed such that the controller state machine enters a blow fuse mode whereupon the fuses are burned according to the already-determined count of the adv_tr pulses. Each digital word in the fuse array may be configured analogously through corresponding high voltage pulses and low voltage pulses.

The read states for the state machine controller may also be determined by the high voltage pulses. For example, in one embodiment, each digital word is confirmed after being written. The external programmer may thus modulate the voltage-modulated signal to configure a given digital word in the fuse array and then trigger an immediate read of this digital word by pulsing high the voltage-modulated input signal. In the read mode for a corresponding digital word, the state machine controller may respond to pulses of the adv_tr signal by reading out corresponding bits of the digital word. Should a particular bit be binary high or low, the state machine controller then either switches on or leaves off a current switch such as an NMOS transistor M1 shown in FIG. 1. This current switch M1 may couple between a resistor R1 and a resistor R2. In turn, resistor R1 couples to signal terminal 106 whereas resistor R2 couples to ground terminal 108. The switching on or off of the current switch M1 may thus modulate an output current that will flow between terminals 106 and 108 based upon a bias voltage applied by the external programming tool. By detecting this current modulation, the external programmer can determine whether a digital word has been correctly written into the fuse array. In alternative embodiments, device 100 may include other current switches (not illustrated) of different sizes in parallel with current switch M1. The selection of a particular current switch in such embodiments thus adjusts the degree of the current modulation. An example application for a two-terminal device will now be discussed.

Figure 2:
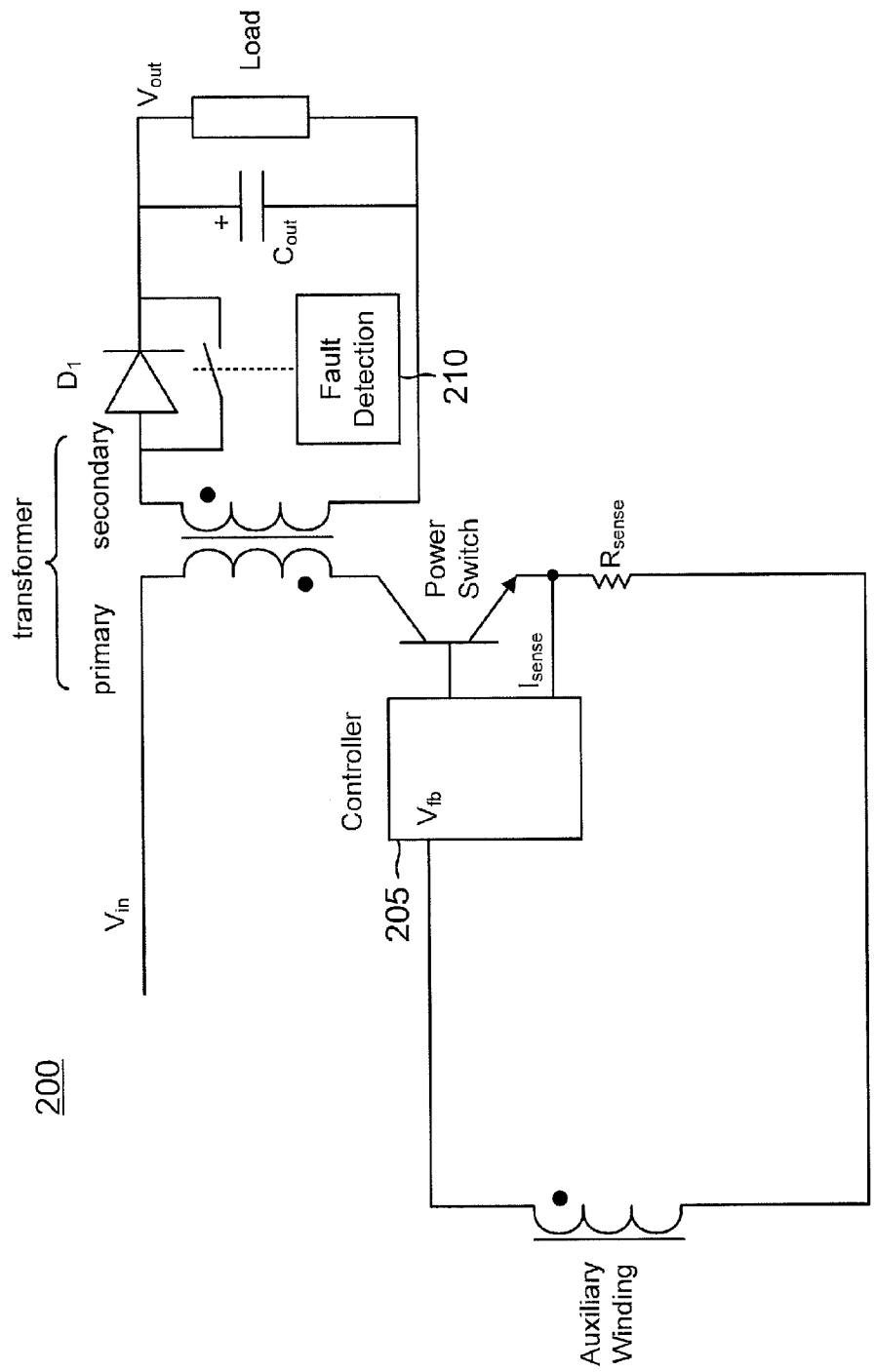
FIG. 2 is a circuit diagram of a flyback converter including a two-terminal activity detector configured as discussed with regard to the two-terminal device of FIG. 1.

Two-terminal devices configured in accordance with the programming techniques disclosed herein have numerous applications. An example two-terminal embodiment for an activity detector 210 in a flyback converter 200 is shown in FIG. 2. Activity detector 210 couples to the anode and cathode of an output diode $D_1$ as discussed in the '482 application. A flyback controller 205 controls the switching of a power switch coupled to the primary winding of a transformer responsive to a feedback voltage $V_{fb}$ obtained from a primary-side auxiliary winding. In addition, controller 205 determines the peak winding current by monitoring a current sense voltage $I_{sense}$ obtained from a terminal of a sense resistor $R_{sense}$ that couples between the power switch and ground. The feedback parameters $V_{fb}$ and $I_{sense}$ are generated in response to cycling of the power switch. During null periods in which the controller 205 is not cycling the power switch, activity detector 210 functions to monitor whether an output voltage has started to decline due to reapplication of a load. This reapplication of the load causes an output capacitor $C_{out}$ to begin to discharge, which induces a voltage difference between the anode and cathode of the output diode $D_1$. Activity detector 210 detects this voltage difference as a fault and responds by switching on its low-impedance path between its terminals that shorts the output diode $D_1$. The resulting pulse of current through the secondary winding of the transformer induces a reflected voltage on the auxiliary winding that controller 205 may respond to by generating another cycle of the power switch. To detect a voltage change across the output diode $D_1$, activity detector 210 may include a comparator (not illustrated) that compares the voltage received at the equivalent of its signal terminal 106 (FIG. 1) to a threshold voltage.

Two-terminal activity detector 210 is quite advantageous in that every extra terminal increases costs. But note that various parameters for activity detector 210 may require configuration depending upon the particular features of a given flyback converter design. A user may thus need to adjust, for example, the threshold voltage used in detecting a fault condition by activity detector 210. Similarly, a user may need to adjust the pulse width of the secondary current pulse that is triggered by activity detector 210. These parameters may be advantageously written into a memory such as a fuse array (FIG. 1) within activity detector 210 as discussed with regard to device 100. An example method of operation for a two-terminal device will now be addressed.

Figure 3:
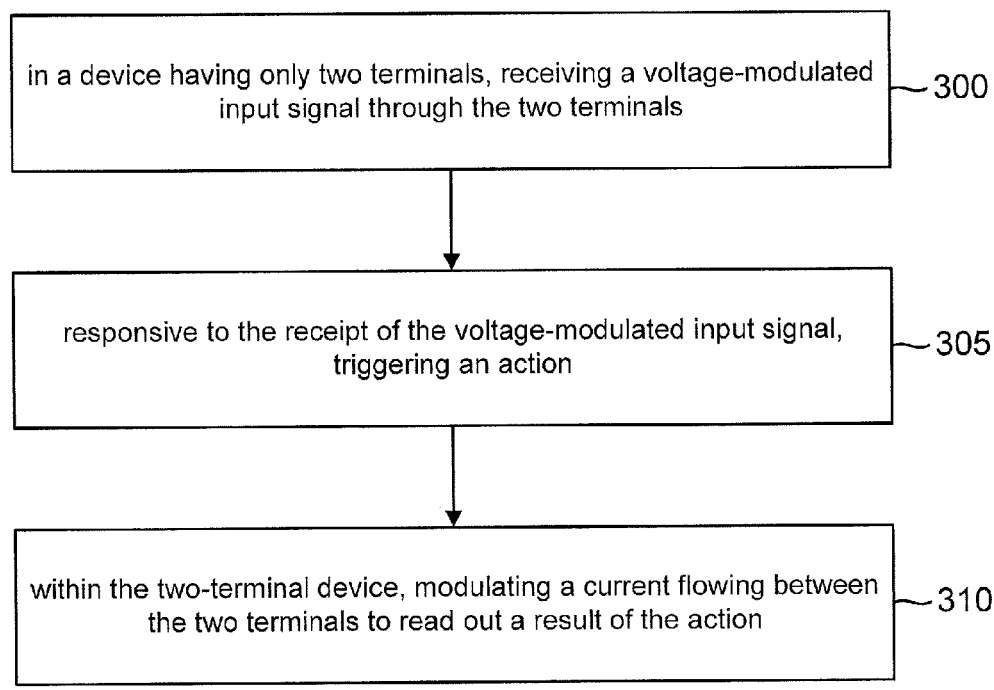
FIG. 3 is a flowchart of an example method of operation for programming and also confirming the programming of a two-terminal device in accordance with an embodiment of the disclosure.

FIG. 3 is a flowchart for an example method of operation for a two-terminal device. An act 300 comprises receiving a voltage-modulated input signal through the two terminals. The receipt of voltage-modulated input signal discussed with regard to device 100 is an example of act 300. The method also includes an act 305 that is responsive to the receipt of the voltage-modulated input signal and comprises triggering an action in the device. An example of such an action would be the configuration of the fuse array in device 100. But as discussed previously, the action triggered in act 305 may comprise a wide variety of actions such as the triggering of a BIST circuit to conduct a test. Finally, the method includes an act 310 carried out within the two-terminal device that comprises modulating a current flowing between the two terminals to read out a result of the action. The confirmation of the fuse array programming as discussed with regard to device 100 is an example of act 310.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to the particular embodiments illustrated and described herein, as they are merely by way of some examples thereof, but rather, the scope should be fully commensurate with that of the claims appended hereafter and their functional equivalents.

We claim:

1. A device, comprising:
    a first terminal;
    a second terminal;
    a current switch coupled between the two terminals; and
    a controller configured to respond to a first voltage modulation of an input signal received through the first and second terminals by triggering a write of at least one digital word to a memory, and wherein the controller is further configured to respond to a second voltage modulation of the input signal by cycling the current switch to read out the at least one digital word from the memory through a current modulation of a current flowing between the first and second terminals.

2. The device of claim 1, wherein the first terminal is a signal terminal, and wherein the second terminal is a ground terminal.

3. The device of claim 1, wherein the memory is a fuse array.

4. The device of claim 1, wherein the memory is a flash array.

5. The device of claim 1, further comprising:
    a voltage divider coupled between the first and second terminals; and
    a high voltage comparator configured to compare a voltage of a first node in the voltage divider to a high voltage threshold and to assert a first output signal responsive to the first node voltage being greater than the high voltage threshold; and
    a low voltage comparator configured to compare a voltage of a second node in the voltage divider to a low voltage threshold and to assert a second output signal responsive to the second node voltage being lower than the low voltage threshold, wherein the high voltage threshold voltage threshold is greater than the low voltage threshold, and wherein the controller comprises a state machine configured to enter a write operation state responsive to a first pulse of the first output signal and to determine a content of a digital word to be written to the memory while in the write operation state responsive to a count of a series of pulses of the second output signal.

6. The device of claim 5, wherein the state machine is further configured to enter a read operation state responsive to a second pulse of the first output signal and, while in the read operation state, to cycle the current switch responsive to a series of pulses of the second output signal to read out a digital word from the memory.

7. The device of claim 1, wherein the current switch comprises an NMOS current switch.

8. The device of claim 7, further comprising a pair of resistors, and wherein the NMOS current switch is coupled between the resistors in the pair.

9. The device of claim 1, further comprising a BIST circuit, wherein the action is an operation of the BIST circuit to test the device, and wherein the result of the action is a read out of a BIST result.

10. The device of claim 1, wherein the device comprises an activity detector for a flyback converter.

11. A method, comprising:
    in a device having only two terminals, receiving a voltage-modulated input signal through the two terminals;
    responsive to the receipt of the voltage-modulated input signal, determining whether the voltage-modulated input signal was pulsed above a high voltage threshold or pulsed below a low voltage threshold, and wherein the high voltage threshold is greater than the low voltage threshold;
    initiating a write operation of a digital word to a memory responsive to a determination that a first pulse of the voltage-modulated input signal is above the high voltage threshold; and
    within the two-terminal device, modulating a current flowing between the two terminals to read out the digital word from the memory.

12. The method of claim 11, further comprising determining a value of the digital word responsive to a count of the voltage-modulated signal being pulsed below the low voltage threshold; and writing the determined digital word into the memory.

13. The method of claim 11, further comprising initiating a read operation of the digital word from the memory responsive to a determination that a second pulse of the voltage-modulated input signal is above the high voltage threshold.

14. The method of claim 12, wherein writing the determined digital word into the memory comprises writing the determined digital word by burning fuses in a fuse array.

15. A flyback converter, comprising:
    a power switch coupled to a primary winding of a transformer; and
    an activity detector coupled to an output diode on a secondary side of the transformer, wherein the activity detector has a first terminal coupled to an anode of the output diode and a second terminal coupled to a cathode of the output diode; wherein the activity detector further includes:
    a memory;
    a current switch; and
    a state machine controller configured to respond to a first voltage modulation of an input signal applied to the first and second terminal by initiating a write operation of digital words into the memory, and wherein the state machine controller is further configured to respond to a second voltage modulation of the input signal by cycling the current switch to current modulate a current flowing between the first and second terminals to read out the digital words from the memory.

16. The flyback converter of claim 15, wherein the activity detector is further configured to determine whether a voltage difference between the anode and the cathode of the output diode exceeds a threshold level, and wherein the digital words include a digital word to configure the threshold level.

17. The flyback converter of claim 16, wherein the digital words include a digital word to configure a pulse width of a secondary current pulse triggered by the activity detector in response to a detection of activity at a load.

* * * * *